Figure 1:
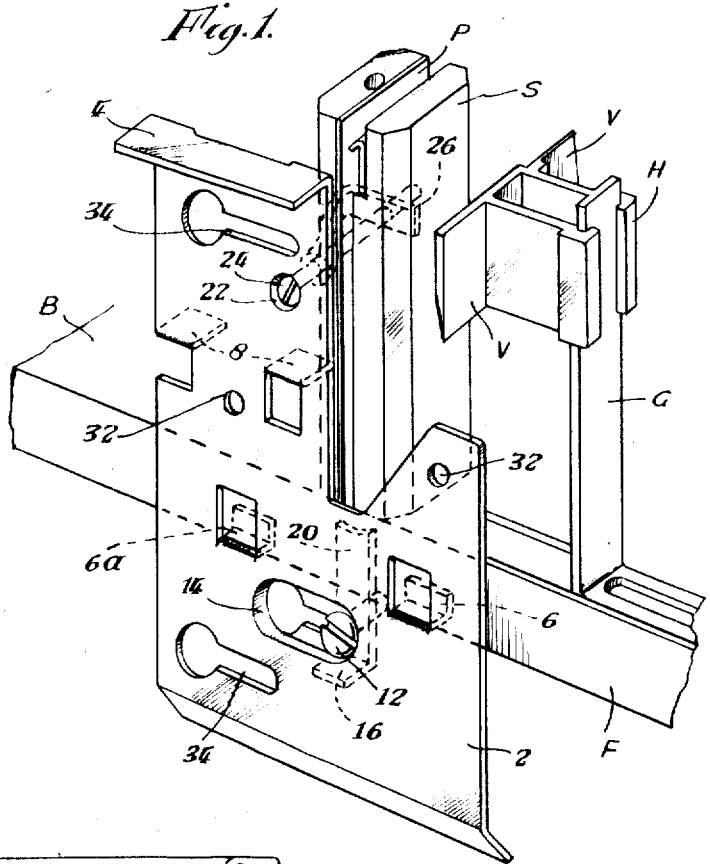

United States Patent

Wynn

[11] 3,861,665
[45] Jan. 21, 1975

[54] LOCATION APPARATUS

[76] Inventor: Gordon William Wynn, 308 Northridge Way, Hemel Hempstead, England

[22] Filed: Mar. 12, 1973

[21] Appl. No.: 340,370

[30] Foreign Application Priority Data
Mar. 13, 1972 Great Britain.................. 11605/72

[52] U.S. Cl.................................. 269/87.2, 83/765
[51] Int. Cl............................................. B27g 5/00
[58] Field of Search............ 83/761, 762, 764, 765, 83/766, 767; 269/87, 87.1, 87.2, 87.3, 97, 98

[56] References Cited
UNITED STATES PATENTS

| | | |
|---|---|---|
| 363,119 | 5/1887 | Criswell................................. 83/765 |
| 522,068 | 6/1894 | Luscher................................. 83/765 |
| 565,652 | 8/1896 | Walter........................... 269/87.2 X |
| 1,193,149 | 8/1916 | Huls...................................... 83/767 |

*Primary Examiner*—Roy Lake
*Assistant Examiner*—Mark S. Bicks

[57] ABSTRACT

A device or arrangement forms an integral part of, or a separate attachment for, saw guide apparatus and functions as a workpiece location guide for making saw cuts in the end face of an elongate workpiece parallel or slightly inclined to the workpiece longitudinal axis. The guide is provided with means for varying the inclination of the workpiece to a saw guide plane about mutually perpendicular axes parallel to a saw guide plane of said apparatus, and for regulating the spacing of successive saw cuts at a given orientation in the workpiece.

23 Claims, 6 Drawing Figures

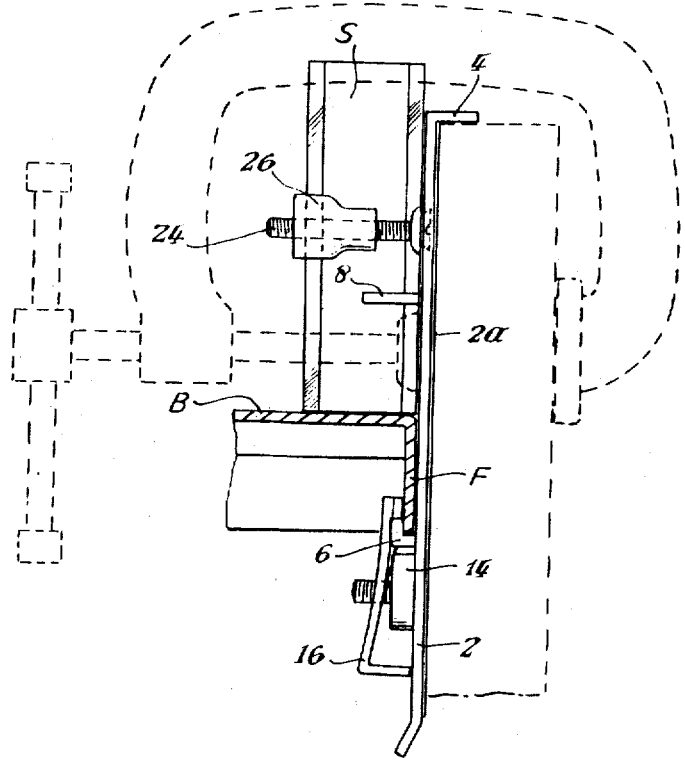
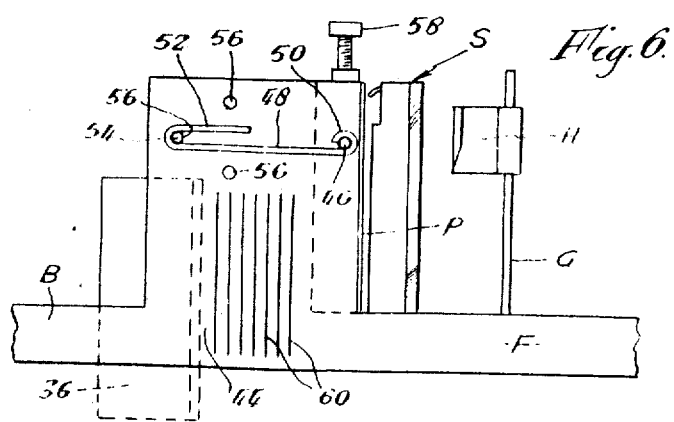

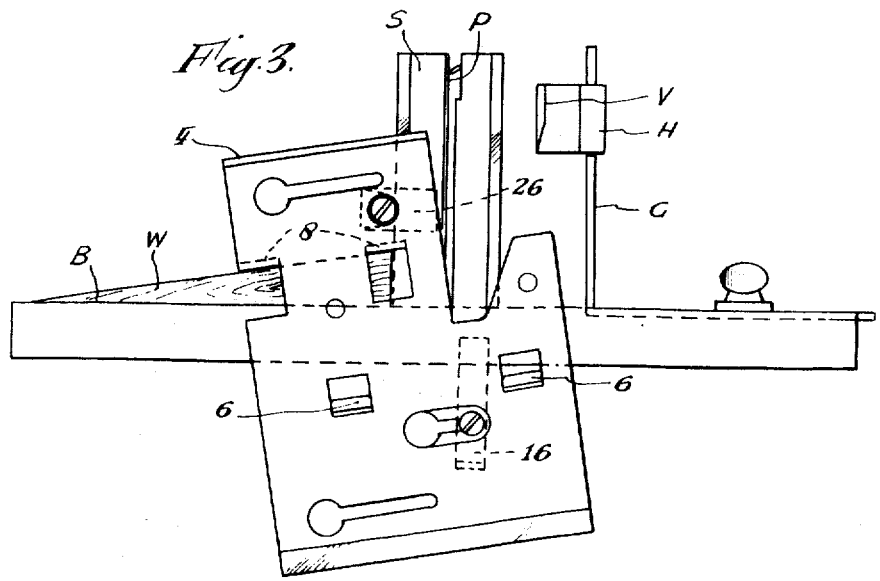
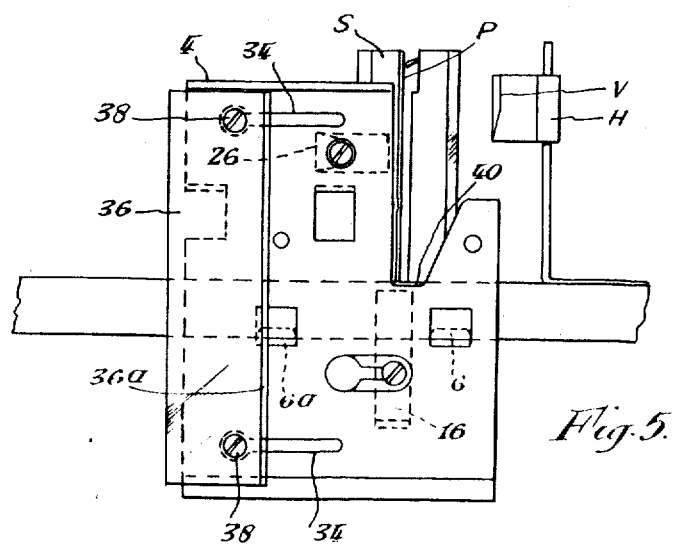

LOCATION APPARATUS

This invention relates to means for the location of workpieces for sawing operations. It is particularly concerned with such location means that can be used in conjunction with, or that form a part of, saw guide apparatus as, for example, that disclosed in my U.S. Patent Application Ser. No. 174,423 filed Aug. 24, 1971 and in German Gebrauchsmuster No. 7,206,843 dated Feb. 24, 1972.

Such apparatus, i.e., comprising a base from which there projects upwardly one or more saw guide members defining a saw guide plane relative to the base, the base being of generally planar form or otherwise comprising elements upon which a workpiece can be placed for sawing, will be referred to hereinafter as "saw guide apparatus of the kind described."

In the specifications of the above-identified application and Gebrauchmuster apparatus of the kind described is shown in each of which the forward one of a pair of co-planar saw guides has associated with it means to control the position of a saw cut made in an end face of an elongate workpiece and extending longitudinally or nearly longitudinally into the workpiece. With the use of this apparatus to form a series of such saw cuts in an end face of a workpiece such that the cuts are accurately positioned relative to each other as may be required for a comb joint or a multiple-pin dovetail joint, a considerable degree of skill is necessary, depiste the assistance offered by said position control means.

It is an object of the present invention to provide means that facilitate the making of a plurality of saw cuts in an elongate workpiece parallel to, or at small angles to, the workpiece longitudinal axis such that the orientation of the saw cuts relative to each other can be predetermined.

According to one aspect of the invention, there is provided a workpiece location device adapted for use with a saw guide apparatus of the kind described and comprising first means for location of a side face of a rectangular elongate workpiece and second means for location of an end face of said workpiece, said second means being arranged to provide an adjustable setting for said end face in a plane perpendicular to the saw guide plane or at a small angle to said perpendicular plane.

It is, however, also possible to have such workpiece location means as an integral part of the saw guide apparatus, and thus, according to another aspect of the invention there is provided saw guide apparatus of the kind described and having a location arrangement comprising first means for location of a side face of a rectangular elongate workpiece and second means for location of an end face thereof, said second means being arranged to provide an adjustable setting for said end face in a plane perpendicular to the saw guide plane or at a small angle to said perpendicular plane.

Advantageously, the said first and/or second location means are arranged to be adjustable in a manner that allows their angular orientation to the saw guide plane to be varied.

In the above-identified prior specifications relating to saw guide apparatus, the workpiece location in a direction transverse to the saw guide plane can be controlled by means comprising an element that can be registered with an existing saw cut to set the position of the workpiece in a transverse direction relative to the saw guide plane whereby a second cut can be made at a predetermined distance from the first cut. Such transverse location means are preferably also arranged to be used with the present invention, so as to facilitate the formation of joints having multiple, regularly spaced projections and recesses, such as comb joints and dovetail joints.

Preferably, the device or apparatus according to the invention additionally comprises a member providing a setting for a further side face of said rectangular elongate workpiece in a plane transverse to the location setting provided by said first means, said member being adjustably securable so as to determine the spacing of said further side face from the saw guide plane.

Figure 4:
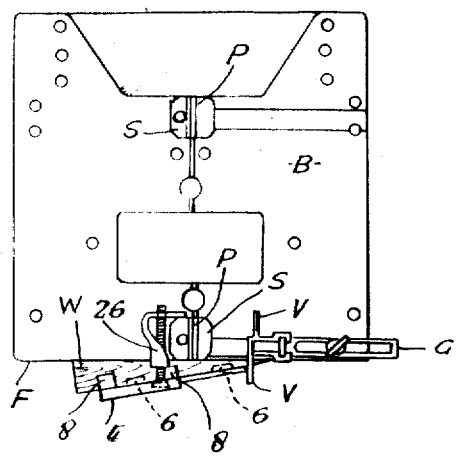

The invention will be more particularly described with reference to the accompanying drawings, wherein:

FIG. 1 is a perspective view of a device according to the invention, illustrating its location against a saw guide apparatus, in one mode of use, FIG. 2 is an end view of the device of FIG. 1, FIGS. 3 and 4 are front and plan views respectively illustrating the use of the device of FIGS. 1 and 2 for cutting the different parts of a dovetail joint, FIG. 5 is a further illustration of the device and apparatus of FIG. 1 showing the use of a setting member for a further side face of the workpiece, and FIG. 6 is a front view of apparatus according to the invention in which the workpiece side face location means form an integral part of the apparatus.

Referring more particularly to FIGS. 1 and 2 of the drawings, the device shown is formed as a sheet metal pressing and has a main, planar body portion 2 at the upper end of which the material is bent over at right-angles to the portion 2 to form a forwardly projecting lip 4. In an intermediate or lower region of the body portion 2 there are pressed out rearwardly a pair of stirrups 6 that provide upwardly open recesses, the bottom faces 6a of the recesses being in a plane parallel to that of the lip 4. Between the lip 4 and the stirrups 6, a pair of lugs 8 are pressed out rearwardly from the plane of the body portion, and these are also in a plane parallel to the lip 4.

The device as thus far detailed is shown in FIGS. 1 to 5 in use in conjunction with one particular form of saw guide apparatus of the kind described, although it can be used with other forms of such apparatus. In the illustrated example, the apparatus comprises a planar base B with spaced front and rear saw guides S having surfaces P defining a saw guide plane, the base B having a series of apertures in its top face for removable dowels or pegs that provide alternative locations for a side face of an elongate workpiece at different angles to the saw guide plane, while the workpiece rests upon the horizontal top surface of the planar base B which has an integral peripheral flange F with a perpendicular outer face.

In the mode of use shown in FIGS. 1 and 2, for example, the device is firmly secured to the base B with the body portion 2 in a vertical plane perpendicular to the main area of the base and to the vertical saw guide plane defined by the saw guide surfaces P. The stirrups 6 of the device, which are provided to locate the device in the vertical direction relative to the base, are hooked under the lower edge of the front flange with their bottom faces 6a bearing against said edge the lip 4 thereby being disposed parallel to the base B.

The device is clamped in position against the flange, both lower and upper clamping means being shown although the former may be unnecessary when the device bears directly onto the flange F. The lower clamping means comprises a screw 12 located in a recessed elongate aperture 14 in the body portion 2, with the screw head thus behind the front face of the portion 2, and securing a lower clamp 16, the clamp having an upwardly directed arm bearing against the inside face of the flange F and a transverse arm 20 the end of which bears against the rear face of the body portion. The upper clamping means comprises a screw 24 the head of which is located in a spherically recessed aperture 22, the screw securing an upper clamp 26 that has a transversely extending limb engaging the rear face of the forward saw guide S to one side of the saw guide plane.

With the device in the position shown in FIGS. 1 and 2, it is possible to secure a rectangular elongate workpiece against the device, with the workpiece longitudinal axis extending vertically by virtue of the location of a side face of the workpiece against the front face of the body portion and an upper end face of the workpiece against the underside of the lip 4. With the workpiece clamped in this position, using the saw guides S a saw cut can be made parallel to the longitudinal axis of the workpiece. By way of confirmation of the registration of the end face of the workpiece against the lip 4 or alternatively thereto, a series of vertical markings (not shown here for the sake of clarity) can be provided on the front face of the body portion against which the workpiece is clamped.

The afore-mentioned prior specifications describe how location means can be provided in the saw guide apparatus to give a predetermined setting for a workpiece at an adjustable distance from the saw guide plane. In the accompanying drawings such location means are also indicated, comprising a gauge bar G securable at an adjustable distance from the saw guide plane and having a vertical limb on which a selector head H is mounted. These location means are described in detail in the earlier specification and for the purpose of the present description it is to be noted in particular that the selector head H has opposite blades V each of tapering form such that the head H can be slipped onto the vertical limb of the gauge bar with either of said blades projecting over the workpiece with the apex of its tapered form lowermost and that in each blade the tapered form comprises a vertical face such that both faces are substantially in a common plane.

It will be seen that, by fixing the gauge bar at a particular spacing from the saw guide plane, a vertical saw cut made in the end face of a workpiece located vertically in the manner described above against the lip 4 can be engaged with or sighted against the projecting blade on the selector head to produce in succession a series of equally spaced cuts, no measurement or gauging being required for these cuts once the gauge bar has been set in position.

If such cuts are to be made to form the tenons of a comb joint in the workpiece end face, however, equal spacing of the saw cuts will produce tenons narrower than the recesses between them by the thickness of one saw kerf. This potential complication is avoided, without any adjustment of the gauge bar setting being necessary, by reversing the selector head for each successive saw cut.

Thus, if the first saw cut made forms a first end face of a tenon, the opposite end face of that tenon is then cut with the previous saw cut engaged by that blade of the selector that has its vertical face directed towards the saw guide plane. The first end face of the following tenon is next cut while said opposite end face saw cut of the first tenon is engaged by that blade of the selector head that has its vertical face directed away from the saw guide plane. This process is repeated, the said first end face cut of the following tenon being engaged by the selector head blade with its vertical face directed towards the saw guide plane, and so on. The material between successive pairs of cuts is then removed to leave recesses between the tenons having a width equal to the tenons. By preparing a second workpiece in this same way, and with the gauge bar setting unchanged, the two workpieces can be comb-jointed together, the tenons of one fitting the recesses of the other.

The device can be used in an analogous manner to cut a plurality of tails or pins for a dovetail joint in the end face of a workpiece. For this, as is shown in FIG. 3, the device is located on the saw guide apparatus using a wedge W of the required dovetail half-angle with one divergent face on the base B and the other divergent face engaged by the lugs 8 of the device. The lip 4 is now set at an angle to the plane of the base equal to the wedge angle. With the gauge bar at a required setting and using a blade of the selector head in each preceding saw cut after the first has been made, one side of each successive pin is formed in turn. The abutment of the workpiece end face against the lip 4 and/or the setting of the workpiece against the markings on the body portion 2 of the device ensures that these cuts are all at the same oblique angle. Since the same side of successive pins is formed in this series of saw cuts there is no need to reverse the selector head between successive cuts.

To cut the other side face of each pin, the workpiece is reversed (the first series of cuts now being inclined to the plane of the base B at twice the wedge angle) and, after the first pin has had its second side face cut at a measured location, successive saw cuts are gauged each from a preceding cut using the selector head as before. It will be noted that no measurement or change or gauge setting is required other than that for the first cut of each of the two series of cuts.

The device can also be employed to cut the dovetail slots or mortices in a second workpiece to receive the dovetail pins. For this, of course, the saw cuts in the second workpiece must be inclined relative to the plane of a longitudinal side edge of the oblong section workpiece at the same angle as that between the cuts forming the pins and the longitudinal side faces of the first workpiece.

To reproduce the same angle of obliquity the same wedge can conveniently be used but, as shown in FIG. 4, it is now placed between the saw guide apparatus base flange F and the location device such that its mutually divergent faces are engaged one with the vertical face of said flange and the other with the rear face of the device. Here the use of the lower clamp 16 is particularly desirable since no support is obtained from the stirrups 6. Horizontal alignment of the lip 4 can be ensured by having the stirrups 6 of the device in abutment with the bottom face of the wedge and locating the top face of the wedge by sight at the level of the base top surface. If required, before the device is secured in position by the clamps 16, 26 the wedge may first be secured to the device by clamping screws (not shown) through apertures 32 (FIG. 1) in the device.

Analogously to the method of sawing the side faces of the pins, the edges at a given side of the respective recesses or mortices are cut in succession. For the other side edge of each recess, the wedge is reversed and they in their turn are then cut in succession : thus, if the first series of side edges are cut with the wedge apex to the right, the second series of cuts with the apex lying to the left so that the two series of cuts are at equal and opposite obliquities to the side faces of the workpiece.

Horizontally elongate slots 34 are provided in the location device, to be used as shown in FIG. 5 to secure a locating member 36 having a right-angled sectional form at a position that is adjustable laterally of the device, the slots receiving clamping screws 38 and having enlarged ends for the insertion of the heads of the screws. The member 36 is intended for use in such tasks as the cutting of tenons. Thus, with the device clamped upon the apparatus (conveniently using the stirrups 6 to locate it) the member 36 can be secured to the device to define a vertical guide plane at an adjustable distance from the saw guide plane. If a rectangular elongate workpiece has each of a pair of opposite sides located in turn against forwardly extending face 36a of member 36 while a longitudinal cut is made in the end of the member at the saw guide plane, the cuts can provide the shoulders of a tenon positioned symmetrically relative to the width of the member. The width of the tenon formed using this procedure is of course determined by the initial location of the member 36.

The use of the member 36 instead of the lip 4 also facilitates the provision of a longer location face, which can be of importance in a mortice and tenon joint, for example, since the length of tenon required will usually be much greater than that of the pins of comb or dovetail joints. To allow relatively deep saw cuts to be made with the member 36 is use, the device will be secured to the saw guide apparatus with recess 40 in its top edge co-incident with the saw guide plane to give clearance for the saw.

The location member 36 may also be of use in the preparation of other joints, such as lap joints and corner bridle joints. In addition, the usefulness of the member 36 can be extended by employing a clamping arrangement that allows it to be located at inclined positions relative to the lip 4, if required, as by allowing some vertical play in the engagement of the clamping screws 38.

While the device has been illustrated and described as a pressed sheet metal construction, it is possible to manufacture it in other ways, as by casting or moulding. Preferably, it is made of a relatively soft material—aluminum might be a suitable choice for a pressed sheet metal or a cast construction—that will not damage the teeth of a saw if it should inadvertently be sawn into during use.

It may also be desirable to give the device a slip-resistant face or coating 2a (FIG. 2) to assist in holding the workpiece in plane, which coating may for example be applied as a plastics dip coating. Additionally or alternatively to such a facing or coating, the outer face of the device may be provided with markings, e.g., rulings, as guides for the setting of a side edge of a workpiece perpendicular to the lip 4. Such markings may also be calibrated to facilitate the setting of the location member 36 at predetermined positions relative to the saw guide plane.

The device has been shown held in place by detachable clamps but it is possible to incorporate clamping means as an integral part of the device, both to secure the device in place and to secure a workpiece to the device. It is also possible for the, or some of the, elements of the device to be integral with the saw guide apparatus or for the clamping means securing the device to be arranged integrally with the saw guide apparatus.

Such an integral arrangement of the workpiece location device is shown in FIG. 6. In many respects the saw guide apparatus is similar to that illustrated in the preceding figures but to one side of the forward saw guide there is a plate 44 cast or moulded integrally with the base B and/or the saw guide S. FIG. 6 shows an arrangement for a right-handed operator, the plate extending to the left of the saw guide. A pin 46 projects forwardly of the plate from the adjacent margin of the saw guide or from the plate immediately adjacent the saw guide. A blade 48 has a pivot engagement 50 with the pin 46 and remote from the engagement 50 the blade 48 comprises a return arm 52 or other form of engagement for a second pin 54 removably insertable in any of a plurality of apertures 56 in the front face of the plate.

In analogy with the separately attachable location device of the preceding figures, the front face of the plate 44 can provide a location for a side face of a workpiece and the bottom face of the blade 48 can provide a location for the top end face of the workpiece. The three alternative apertures 56 for the pin 54 locate said blade bottom face either horizontally or at an inclination, in either direction to the horizontal, equal to the angle of the wedge W. Inclination of the workpiece in a direction similar to that shown in FIG. 4 can be obtained by interposing the wedge between the workpiece and the plate 44: the width of the blade 48 would of course be such that it then extends forwards of the front face of the wedge. It is also possible to provide a second side face location, similar to the angle-section member 36, either as a member removable from the plate 44 or held captive thereon.

FIG. 6 also shows an adjustable depth stop 58 mounted in the front saw guide of the apparatus, the purpose of which is to limit the depth of a saw cut by engaging the back or spine of the tenon saw being used. Where the workpiece location device is separable from the saw guide apparatus it is also possible to provide a saw depth stop on the device. Also illustrated in FIG. 6 are the vertical guide markings 60 already mentioned in connection with the device of FIGS. 1 to 5. As in that device, the front surface of the plate 44 can have a slip-resistant coating.

What I claim and desire to secure by Letters Patent is:

1. A workpiece location device for attachment to a saw guide apparatus having an elongate base terminating in a forward end and at least one saw guide member projecting upwardly from the base at the forward end thereof to define a saw guide plane relative to the base, said device comprising, in combination, first means providing an essentially planar element at said forward end of the base and being related thereto for location against said upright planar element, clear of said forward end of the base, of a side face of a rectangular elongate workpiece, and second means comprising a second element extending from said upright planar element, above said base, in a direction longitudinally beyond the forward end of the base for location thereagainst of an end face of the workpiece, said second means providing an adjustable setting for said end face in a plane at or close to the perpendicular to the saw guide plane.

2. A device according to claim 1 further comprising a supplementary member providing a setting for a further side face of said elongate workpiece in a plane transverse to the location setting provided by said planar element, said member being adjustably securable so as to determine the spacing of said further side face from the saw guide plane.

3. A device according to claim 2 wherein said supplementary member is adjustable in a manner varying the angular orientation of said workpiece further side face relative to the saw guide plane.

4. A device according to claim 1 having a slip-resistant surface in an area providing an engaging face for a workpiece.

5. A device according to claim 1 wherein said planar element has a surface provided with location markings extending at an angle to said workpiece end face location second element.

6. A device according to claim 1 further comprising a setting element and means for engagement therewith to determine the orientation of at least one of said first and second elements obliquely to the saw guide plane.

7. A device according to claim 1 wherein said base lies in a horizontal plane, means being provided to secure said second element adjustably in such manner as to provide a range of locations for the workpiece end face oblique to said saw guide plane and to the horizontal plane in which said base lies.

8. A device according to claim 1 wherein said base lies in a horizontal plane, at least one abutment element being provided that is engageable with the saw guide apparatus to determine the setting of said second element, said second element being adjustable to provide a range of locations for the workpiece end face oblique to said saw guide plane and to the horizontal plane in which said base lies.

9. A device according to claim 1 wherein means are provided to secure said planar element adjustably in such manner as to provide a range of locations for the workpiece side face oblique to the saw guide plane with said element providing an end face setting perpendicular to the saw guide plane.

10. A device according to claim 1 further comprising at least one abutment element and setting means cooperating with said planar element for adjusting the position thereof within a range of locations for positioning the workpiece side face oblique to the saw guide plane and with an end face setting determined by said second element parallel to the base.

11. A device according to claim 1 wherein a downwardly extending recess is provided in said planar element immediately adjacent said second element to provide clearance for a saw blade.

12. In combination with saw guide apparatus including a base and at least one saw guide member projecting upwardly from the base and defining a saw guide plane relative to the base, a workpiece location structure disposed adjacent said saw guide plane and including first location means defining a location plane extending vertically and uninterrupted by said base for a side face of a rectangular elongate workpiece that extends above and below the base and second location means for location of an upper end face of the workpiece above the base, said second means providing an adjustable setting for said end face in a plane at or close to the perpendicular to the saw guide plane whereby the longitudinal axis of the workpiece is disposed in or at a small angle to a plane parallel to the saw guide plane.

13. The combination according to claim 12 further comprising a supplementary member providing a setting for a further side face of said elongate workpiece in a plane transverse to the location setting provided by said first means, said member being adjustably securable to determine the spacing of said further side face from the saw guide plane.

14. The combination according to claim 13 wherein said supplementary member is adjustable to vary the angular orientation of said workpiece further side face relative to the saw guide plane.

15. The combination according to claim 12 having a slip-resistant surface in an area providing an engagement face for a workpiece.

16. The combination according to claim 12 wherein said first location means has a surface provided with location markings extending at an angle to said workpiece end face location element.

17. The combination according to claim 12 wherein means are provided to secure said second location means adjustably in such manner as to provide a range of locations for the workpiece end face oblique to said saw guide plane and to the horizontal.

18. The combination according to claim 12 wherein said first location means is provided by a generally planar member and said second location means comprises a member directed perpendicularly to the plane of said member and at an upper region thereof.

19. The combination according to claim 18 wherein a pivot mounting connects said member of the second location means to said planar member and means are provided to secure said member of the second location means at any of a plurality of different and predetermined angular settings selectively.

20. A workpiece location device for attachment to a saw guide apparatus having a base providing a planar location upon which the workpiece can be placed for sawing and at least one saw guide member projecting upwardly from the base to define a saw guide plane transverse to the plane of the base, said device comprising, in combination, a generally planar member and means attaching said member in an adjustable manner to the apparatus, one main planar face of said member providing a vertical location plane for a first side face of a pair of mutually perpendicular side faces of a rectangular elongate workpiece and an element at an upper region of the member extending perpendicular to said face to form a location for an upper end face of said workpiece, at least one further element projecting oppositely to said end face location element for location of the device with respect to the saw guide apparatus whereby to determine the orientation of said end face location element relative to said base of the saw guide apparatus such that said element provides a setting for said end face in a plane perpendicular to the saw guide plane or at a small angle to said perpendicular plane, a supplementary member for location of the workpiece second side face transverse to said main planar face and to said end face location element setting, and means detachably securing said supplementary member to the planar member in an adjustable manner whereby to regulate the spacing of said second side face location from the saw guide plane.

21. In saw guide apparatus comprising a base providing a planar location upon which a workpiece can be placed for sawing, and at least one saw guide member projecting upwardly from the base and defining a saw guide plane extending upwardly from the plane of the base, the improvement consisting of a location arrangement at an edge of the base adjacent said saw guide means and extending upwardly from said base, said arrangement including (a) first and second planar elements, (b) the first planar element extending upwardly and providing a first location plane clear of the base for a side face of a rectangular elongate workpiece, said first location plane being transverse to the saw guide plane and to the plane of the base, whereby the workpiece is able to extend through the plane of the base with its longitudinal axis transverse thereto, (c) the second planar element being disposed above the plane of the base and projecting transversely to said first element to serve for location of an upper end face of said workpiece in a second location plane transverse to the first location plane, (d) adjustment means for said second element providing a variable angular setting for said second location plane at or close to a perpendicular to said saw guide plane whereby the longitudinal axis of said workpiece is diposed in or close to a plane parallel to said saw guide plane, (e) an upper portion of said first planar element having a recess extending downwardly from its upper edge and adjacent said second element whereby the arrangement can be disposed with said recess in registration with the saw guide plane for location of portions of the first element on opposite sides of the saw guide plane and for location of the second element to one side of the saw guide plane.

22. A location arrangement according to claim 21 wherein engagement means are provided on the first planar element spaced below the second planar element and projecting to the opposite side of the first planar element for engagement with the base to determine the angular orientation of said second planar element relative to the plane of the base.

23. In combination with saw guide apparatus including a base providing location, and at least one saw guide member fixed adjacent an edge of the base and projecting upwardly from the plane of the base, a location structure disposed at said edge of the base adjacent said saw guide means and extending upwardly from said base, said structure comprising (a) first and second planar elements, (b) the first planar element extending vertically at said edge of the base and transversely to the saw guide plane, an outer face of said element thereby providing a first location plane clear of the base for a side face of a rectangular elongate workpiece whereby said workpiece can be secured with a side face in contact with said element outer face and extending both above and below the plane of the base, (c) clamping means mounted on the first planar element for securing the location structure to said saw guide member, (d) the second planar element being disposed at an upper region of the first planar element above the plane of the base and projecting to one side of said first element transversely thereto to serve for location of an upper end face of said workpiece transversely to the first element and the saw guide plane, (e) said second element providing an adjustable angular setting for said end face in a plane parallel or at a small angle to the plane of the base whereby the longitudinal axis of said workpiece is disposed in or close to a plane parallel to said saw guide plane, (f) a recess in said upper region of the first planar element extending downwardly from the upper edge of said region and laterally adjacent said second element whereby the structure can be disposed with the saw guide plane extending within said recess to permit the passage of a saw blade below the level of said second element, portions of the first element on opposite sides of the recess being disposed to opposite sides of the saw guide plane, (g) the second planar element being mounted on one of said first element portions and the other of said portions terminating at a lower level than the second planar element, (h) a supplementary element adjustably secured to the first planar element for providing a location for a second side face of the workpiece transverse to said second side face whereby to position said second side face at a chosen spacing from the saw guide plane.

* * * * *